United States Patent
Brinkmann et al.

(10) Patent No.: US 11,835,039 B2
(45) Date of Patent: Dec. 5, 2023

(54) METHOD FOR MONITORING THE FUNCTIONING OF A COMPRESSOR

(71) Applicant: WABCO GMBH, Hannover (DE)

(72) Inventors: Stefan Brinkmann, Wunstorf (DE); Dirk Hillbring, Celle (DE); Heinrich Diekmeyer, Barsinghausen (DE)

(73) Assignee: ZF CV Systems Hannover GmbH, Hannover (DE)

( * ) Notice: Subject to any disclaimer, the term of this patent is extended or adjusted under 35 U.S.C. 154(b) by 271 days.

(21) Appl. No.: 17/267,234

(22) PCT Filed: Jul. 2, 2019

(86) PCT No.: PCT/EP2019/067732
§ 371 (c)(1),
(2) Date: Feb. 9, 2021

(87) PCT Pub. No.: WO2020/030350
PCT Pub. Date: Feb. 13, 2020

(65) Prior Publication Data
US 2021/0164465 A1 Jun. 3, 2021

(30) Foreign Application Priority Data

Aug. 9, 2018 (DE) .................. 102018119374.2

(51) Int. Cl.
*F04B 49/08* (2006.01)
*F04B 49/06* (2006.01)
(Continued)

(52) U.S. Cl.
CPC ............ *F04B 49/08* (2013.01); *F04B 49/065* (2013.01); *F04B 49/20* (2013.01); *F04B 51/00* (2013.01);
(Continued)

(58) Field of Classification Search
CPC ........ F04B 49/08; F04B 49/065; F04B 51/00; F04B 2201/1201; F04B 2205/05; F04B 2205/09; B60T 17/002; B60T 17/02
See application file for complete search history.

(56) References Cited

U.S. PATENT DOCUMENTS

| 6,374,193 | B1 | 4/2002 | Kutscher et al. |
| 10,391,830 | B2 * | 8/2019 | Bohn ................. F04B 53/10 |

(Continued)

FOREIGN PATENT DOCUMENTS

| DE | 69104596 T2 | 5/1995 |
| DE | 19801665 C2 | 4/2000 |

(Continued)

OTHER PUBLICATIONS

English translation of International Search Report for PCT/EP2019/067732 dated Sep. 25, 2019, 2 pages.
(Continued)

*Primary Examiner* — Charles G Freay
(74) *Attorney, Agent, or Firm* — WARNER NORCROSS + JUDD LLP

(57) ABSTRACT

A method for monitoring the functioning of a compressor, which is switchable into a delivery mode and, when in the delivery mode, delivers compressed air via a dryer line of a compressed-air preparation unit into at least one main supply line, from which multiple supply lines of compressed-air consumer circuits branch off, wherein a pressure sensor is connected at each of at least some of the supply lines, is disclosed. The method results in outputting a warning message if a weighted pressure gradient $grd\_p_{V\_W}$ has not exceeded a gradient limiting value $grd\_p_{G\_W}$ within a predefined monitoring time period $T_M$.

18 Claims, 2 Drawing Sheets

(51) Int. Cl.
    *F04B 51/00*     (2006.01)
    *F04B 49/20*     (2006.01)
    *F25B 49/02*     (2006.01)
    *B60T 17/02*     (2006.01)
    *B60T 17/00*     (2006.01)

(52) U.S. Cl.
    CPC ............ *B60T 17/002* (2013.01); *B60T 17/02* (2013.01); *F04B 2201/1201* (2013.01); *F04B 2203/0209* (2013.01); *F04B 2205/05* (2013.01); *F04B 2205/09* (2013.01); *F04B 2207/70* (2013.01); *F25B 49/022* (2013.01)

(56) References Cited

U.S. PATENT DOCUMENTS

| | | | |
|---|---|---|---|
| 10,691,999 B2 * | 6/2020 | Trischler | G06N 5/022 |
| 2008/0040013 A1 * | 2/2008 | Detlefs | B60T 17/22 |
| | | | 701/78 |
| 2011/0259289 A1 * | 10/2011 | Fujiyoshi | F01L 1/3442 |
| | | | 123/90.15 |
| 2012/0073669 A1 * | 3/2012 | Diekmeyer | B60G 17/0523 |
| | | | 137/561 R |
| 2013/0167810 A1 | 7/2013 | Roplekar et al. | |

FOREIGN PATENT DOCUMENTS

| | | |
|---|---|---|
| DE | 19911741 A1 | 9/2000 |
| DE | 102004026624 B3 | 6/2005 |
| DE | 102006013189 A1 | 11/2006 |
| DE | 112008001825 T5 | 6/2010 |
| DE | 112012005530 T5 | 9/2014 |
| DE | 102014018437 A1 | 6/2016 |
| EP | 0491275 A1 | 6/1992 |

OTHER PUBLICATIONS

Machine assisted English translation of DE19911741A1 obtained from https://patents.google.com/patent on Feb. 9, 2021, 7 pages.
Machine assisted English translation of DE102004026624B3 obtained from https://patents.google.com/patent on Feb. 9, 2021, 8 pages.
Machine assisted English translation of DE102006013189A1 obtained from https://patents.google.com/patent on Feb. 9, 2021, 11 pages.
Machine assisted English translation of DE112008001825T5 obtained from https://patents.google.com/patent on Feb. 9, 2021, 12 pages.
Machine assisted English translation of DE102014018437A1 obtained from https://patents.google.com/patent on Feb. 9, 2021, 6 pages.

* cited by examiner

METHOD FOR MONITORING THE FUNCTIONING OF A COMPRESSOR

CROSS-REFERENCE TO RELATED APPLICATIONS

This application is the National Stage of International Application No. PCT/EP2019/067732, filed on Jul. 2, 2019, which claims priority to and all advantages of German Patent Application No. 10 2018 119 374.2, filed on Aug. 9, 2018, the content of which is hereby incorporated by reference.

FIELD OF THE DISCLOSURE

The invention relates to a method for monitoring the functioning of a compressor, which is switchable into a delivery mode and, when in the delivery mode, delivers compressed air via a dryer line of a compressed-air preparation unit into at least one main supply line, from which multiple supply lines of compressed-air consumer circuits branch off, wherein a pressure sensor is connected at each of at least some of the supply lines, wherein, in the delivery mode of the compressor, a supply pressure is detected with the aid of sensors, a pressure gradient derived therefrom is compared to a predefined limiting value, and, depending on the result of the comparison, a warning message or a warning signal is output or not.

BACKGROUND

Modern electronically controlled compressed-air supply systems comprise a compressed-air preparation unit including filter units and dryer units, a multi-circuit protection valve formed integrally with overflow valves of multiple compressed-air consumer circuits, and an electronic control unit, to which pressure sensors for detecting the supply pressures of at least some compressed-air consumer circuits are also assigned. In the delivery mode, air is drawn in from the surroundings and compressed and, thereafter, delivered into at least one main supply line via a dryer line of the compressed-air preparation unit with the aid of a compressor, which is usually of a piston design and is coupleable via the engagement of a friction clutch to the drive engine of the particular motor vehicle and, therefore, is switchable into the delivery mode. Multiple supply lines of compressed-air consumer circuits branch off from the main supply line via an overflow valve of a multi-circuit protection valve in each case, wherein a pressure sensor is connected at each of at least some of these compressed-air consumer circuits for detecting the supply pressure there.

In order to detect a defect at the compressor or in the compressed-air supply system, monitoring methods are known, which are based, in principle, on detecting, in the delivery mode of the compressor, a delivery or supply pressure or the pressure gradient of a delivery or supply pressure with the aid of sensors and comparing this to a predefined limiting value and, depending on the result of the comparison, outputting a warning signal, if necessary.

In a known monitoring method according to DE 198 01 665 C2, it is provided that, in the delivery mode of the compressor, the actual pressure profile of the delivery pressure is detected with the aid of sensors and is compared to a setpoint pressure profile under consideration of the initial pressure. The setpoint pressure profile has been ascertained in advance in a delivery mode of a reference compressor and stored in the form of a second degree polynomial in a data memory of an electronic storage unit. An upper tolerance limit and a lower tolerance limit are defined about the setpoint pressure profile. When the actual pressure profile of the delivery pressure exceeds the upper tolerance limit or falls below the lower tolerance limit, a warning signal is output. Different causes of the malfunction can be inferred from the direction of the deviation of the actual pressure profile from the setpoint pressure profile.

DE 10 2004 026 624 B3 describes a method for controlling a compressed-air preparation unit, in which, in the delivery mode of the compressor, the pressure gradient of the supply pressure is detected with the aid of sensors in a main supply line connected downstream from the compressed-air preparation unit and compared to a reference gradient, which was detected in the new state of the compressor and the compressed-air preparation unit. The method is utilized mainly for adapting the regeneration air volume to the previously actually delivered air volume, which is derived from the deviation of the current pressure gradient from the pressure gradient ascertained in the new state and is appropriately corrected. The detection of the pressure gradient in the new state as well as of the current pressure gradient preferably takes place for the case on which no compressed air is withdrawn from the main supply line by the connected compressed-air consumer. The method can be additionally utilized for monitoring the functioning of the compressor. In this way, a wear-related reduction of the efficiency of the compressor is detected and an appropriate warning signal is output if, in the delivery mode, the current pressure gradient of the supply pressure falls below the pressure gradient in the new state by more than a predefined limiting difference.

In the monitoring method for a compressed-air supply system known from DE 10 2014 018 437 A1, a state variable of the compressed air delivered downstream from the compressor, for example, the supply pressure in the main supply line, is detected with the aid of sensors before the delivery mode as well as during the delivery mode of the compressor. The detection of the state variable takes place for as long as it takes for the state variable to exceed a predefined limiting value. Thereafter, the period of time between the detection of the state variable before the delivery mode and the detection of the last value of the state variable during the delivery mode is observed. If this period of time exceeds a predefined time interval reference value by more than a predefined tolerance interval, a warning signal is output.

The known methods are based on a constant drive rotational speed of the compressor in the delivery mode and do not take into account that a compressor driven by the drive engine of a motor vehicle is operated with a variable rotational speed. As the drive rotational speed increases, however, as is known, the delivery volume flow of a compressor and, therefore, the pressure gradient generated downstream in the supply lines increase, and so a certain supply pressure is reached correspondingly sooner. In addition, the known methods are not suitable for differentiating between various causes of a fault in the case of an arising deviation of the delivery rate of a compressor and proactively detecting faults with respect to the forward-looking planning of maintenance and repair measures.

The problem addressed by the present invention was therefore that of providing a method for monitoring the functioning of a compressor of a compressed-air supply system having the configuration described at the outset, with which, taking a variable drive rotational speed into account, causes of a fault in the surroundings of the compressor can be detected early and fault-specifically and indicated via the output of appropriate warning messages or warning signals for the timely preparation of maintenance and repair measures.

BRIEF SUMMARY

A method for monitoring the functioning of a compressor, which is switchable into a delivery mode, and which, in the delivery mode, delivers compressed air via a dryer line of a compressed-air preparation unit into at least one main supply line, from which multiple supply lines of compressed-air consumer circuits branch off, wherein a pressure sensor is connected at each of at least some of the supply lines, wherein, in the delivery mode of the compressor, a supply pressure $p_V$ is detected with the aid of sensors, a pressure gradient derived therefrom is compared to a predefined limiting value, and, depending on the result of the comparison, a warning message or a warning signal is output or not, includes the following method steps:

a) continuously detecting, with the aid of sensors, the supply pressure $p_V$ in the supply line of at least one compressed-air consumer circuit provided with a pressure sensor, b) continuously calculating the pressure gradients $grd\_p_V$ of the supply pressure $p_V$ from at least two consecutively detected pressure values $p_{V\_i}$, $p_{V\_i+1}$ in each case and the time difference $\Delta t$ between their detection at least during the delivery mode $T_{F1}$, $T_{F2}$, $T_{F3}$ of the compressor, c) weighting the pressure gradients $grd\_p_V$ by division by the particular current drive rotational speed $n_K$ of the compressor ($grd\_p_{V\_W}=grd\_p_V/n_K$) or by the particular current rotational speed-dependent setpoint delivery rate $Q_{soll}$ of the compressor ($grd\_p_{V\_W}=grd\_p_V/Q_{soll}$), d) comparing the weighted pressure gradients $grd\_p_{V\_W}$ with a predefined gradient limiting value $grd\_p_{G\_W}$, e) outputting a warning message or warning signal if the weighted pressure gradient $grd\_p_{V\_W}$ has not exceeded the gradient limiting value $grd\_p_{G\_W}$ within a predefined monitoring time period $T_M$.

The invention is therefore directed to a compressor known, per se, which is switchable into a delivery mode, for example, via the engagement of a friction clutch, which is drivable by a drive engine of a motor vehicle, or by switching on an associated electric motor, and which, in the delivery mode, delivers compressed air via a dryer line of a compressed-air preparation unit into at least one main supply line. Multiple supply lines of compressed-air consumer circuits branch off from the main supply line, wherein a pressure sensor is connected at each of at least some of the supply lines. In the delivery mode of the compressor, a supply pressure $p_V$ is detected with the aid of sensors. A pressure gradient $grd\_p_V$ is derived from this supply pressure $p_V$ and compared to a predefined limiting value. Depending on the result of the comparison, a warning message or a warning signal is output or not.

Due to the weighting of the calculated values of the pressure gradient $grd\_p_V$ of the supply pressure $p_V$ with the particular current drive rotational speed $n_K$ of the compressor or with the particular current rotational speed-dependent setpoint delivery rate $Q_{soll}$ of the compressor, the influence of the rotational drive speed $n_K$ on the supply pressure $p_V$ is largely eliminated. The pressure gradient $grd\_p_{V\_W}$ weighted in this way therefore forms—in delivery modes of the compressor, during which a greater withdrawal of compressed air in the compressed-air consumer circuits does not occur—a plateau in its graphically plotted curve profile, the level or value of which is well comparable to the gradient limiting value $grd\_p_{G\_W}$. The current value for the setpoint delivery rate $Q_{soll}$ of the compressor can be retrieved, for example, from an operating characteristic map stored in an electronic control unit ECU. The value of a mean setpoint delivery rate $Q_{soll\_m}$ can be determined from the shape of the curve over time of the setpoint delivery rate $Q_{soll}$.

The drive rotational speed $n_K$ of the compressor is frequently identical to the engine speed $n_M$ of the drive engine ($n_K=n_M$), since the compressor is usually directly coupled to the crankshaft of the drive engine via a friction clutch. By comparison, if the compressor is driven via a power take-off of the drive engine or of the driving transmission, the drive rotational speed $n_K$ of the compressor is in a fixed ratio with respect to the engine speed $n_M$ of the drive engine ($n_K=n_M/i_{PTO}$). Alternatively, the compressor can also be driven by an electric motor. In this case, the drive rotational speed $n_K$ of the compressor corresponds to the rotational speed of the electric motor and is then largely constant. The rotational speed of the electric motor can be predefined by the electronic control unit ECU.

The monitoring method according to the invention assumes that, within the monitoring time period $T_M$, multiple delivery modes of the compressor occur, in which compressed air in the compressed-air consumer circuits is withdrawn to a greater extent, and the gradient limiting value $grd\_p_{G\_W}$ is therefore not exceeded by the weighted pressure gradient $grd\_p_{V\_W}$ of the supply pressure $p_V$. Likewise, the monitoring method according to the invention assumes that, within the monitoring time period $T_M$, multiple delivery modes of the compressor occur, in which no compressed air in the compressed-air consumer circuits is withdrawn over a longer period of time, and the gradient limiting value $grd\_p_{G\_W}$ is therefore exceeded by the weighted pressure gradient $grd\_p_{V\_W}$ of the supply pressure $p_V$, provided there is no fault in the surroundings of the compressor or in the compressed-air supply system.

The warning message or the warning signal can take place via the illumination of a warning light in the dashboard or in the instrument panel of the motor vehicle, via the illumination of an appropriate warning icon in the instrument panel, via the display of an appropriate warning text in a display of the instrument panel, and/or via the storage of an appropriate error message in a fault memory associated with the electronic control unit of the compressed-air supply system. The monitoring method according to the invention relies on existing pressure and rotational speed sensors and is purely software-based. Therefore, no additional equipment is necessary for the application of the monitoring method, thereby saving costs.

The problem addressed is also solved by a slightly modified method, in which a weighting of the calculated values of the pressure gradient $grd\_p_V$ of the supply pressure $p_V$ is omitted.

The invention therefore also relates to a method for monitoring the functioning of a compressor, which is switchable into a delivery mode and, when in the delivery mode, delivers compressed air via a dryer line of a compressed-air preparation unit into at least one main supply line, from which multiple supply lines of compressed-air consumer circuits branch off, wherein a pressure sensor is connected at each of at least some of the supply lines, wherein, in the delivery mode of the compressor, a supply pressure $p_V$ is detected with the aid of sensors, a pressure gradient derived therefrom is compared to a predefined limiting value, and, depending on the result of the comparison, a warning message or a warning signal is output or not. According to the invention, this alternative method comprises the following method steps:

a) continuously detecting, with the aid of sensors, the supply pressure $p_V$ in a main supply line or in the supply line of at least one compressed-air consumer circuit provided with a pressure sensor, b) continuously calculating the pressure gradients $grd\_p_V$ of the supply pressure $p_V$ from at least two consecutively detected pressure values $p_{V\_i}$, $p_{V\_i+1}$ in each case and the time difference $\Delta t$ between their detection at least during the delivery mode of the compressor, c) comparing the pressure gradients $grd\_p_V$ with a particular current, rotational speed-dependent, predefined gradient limiting value $grd\_p_G$, which does not take the withdrawal of compressed air by the consumers into account, e) outputting a warning message or warning signal if the pressure gradient $grd\_p_V$ has not exceeded the particular gradient limiting value $grd\_p_G$ within a predefined monitoring time period $T_M$.

For the two illustrated methods, which are alternative to each other, it is considered to be advantageous when it is provided that pressure fluctuation values of the supply pressure $p_V$ that are based on thermodynamic effects that arise in the compressed-air consumer circuits after consumption of compressed air are not taken into account.

In order to compensate for the effect of pressure fluctuations and measuring errors and to achieve a smoothed pressure profile of the supply pressure $p_V$, which is advantageous for the method, it is preferably provided that the values of the supply pressure $p_{V\_i}$, $p_{V\_i+1}$ detected with the aid of sensors, and/or the values of the pressure gradients $grd\_p_V$, $grd\_p_{V\_W}$ calculated on the basis thereof are low-pass filtered.

Likewise, it is advantageous when the pressure values $p_{V\_i}$, $p_{V\_i+1}$ detected with the aid of sensors, and/or the values of the pressure gradients $grd\_p_V$, $grd\_p_{V\_W}$ calculated on the basis thereof are low-pass filtered for an established period of time $T_A$. After a greater drop of the supply pressure $p_V$, which can be caused by the withdrawal of a larger compressed air volume in one of the compressed-air consumer circuits, the subsequent pressure increase due to thermodynamic effects is considerably greater than is possible due solely to the delivery mode of the compressor. This disruptive effect is eliminated due to the low-pass filtering of the calculated values of the unweighted pressure gradient $grd\_p_V$ and of the weighted pressure gradient $grd\_p_{V\_W}$.

Alternatively to the low-pass filtering, for the same purpose, the calculation of the unweighted pressure gradients $grd\_p_V$ and of the weighted pressure gradients $grd\_p_{V\_W}$ can be suspended for an established period of time $T_A'$ after the occurrence of a greater drop of the supply pressure $p_V$.

The gradient limiting value $grd\_p_{W\_G}$ is preferably defined as a fraction, determined by an adaptation factor $f_A<1$, of a weighted pressure gradient $grd\_p_{C\_W}$ that is characteristic for the compressor, the compressed-air supply system, and the connected compressed-air consumer circuits $(grd\_p_{W\_G}=f_A \times grd\_p_{C\_W})$. The characteristic pressure gradient $grd\_p_{C\_W}$ weighted with the drive rotational speed $n_K$ of the compressor is the pressure gradient per revolution of the compressor that could be achieved under ideal conditions, i.e., without the throttling effect of lines, filters, and dryers, as well as without consumption of compressed air. Due to the multiplication by the adaptation factor $f_A$, the characteristic pressure gradient $grd\_p_{C\_W}$ is reduced to a realistic variable of the gradient limiting value $grd\_p_{W\_G}$, which, on the one hand, takes the system characteristics and, on the other hand, the permitted reduction of the functioning of the compressor into account.

When a consumer having a permanent consumption of compressed air is present in the compressed-air supply system, for example, due to a continuously opening pressure limiting valve, or in one of the compressed-air consumer circuits, the characteristic pressure gradient $grd\_p_{C\_W}$ is preferably multiplied by a correspondingly smaller adaptation factor $f_A$. In order to avoid a permanent consumption of compressed air in the pressure supply system, a pressure limiting valve with hysteresis is preferably utilized there.

The characteristic pressure gradient $grd\_p_{C\_W}$ can be determined, for example, from the displacement of the compressor $V_K$, the volumetric efficiency $\eta V$ of the compressor, and the storage volume $V_S$ of all compressed-air consumer circuits. At a displacement of the compressor of $V_K=636$ cm$^3$ and a storage volume of the compressed-air consumer circuits of $V_S=80$ l, the result, at a mean drive rotational speed of the compressor of $n_{K\_m}=1500$ rpm, is an unweighted characteristic pressure gradient of $grd\_p_C=7.2$ bar/min and a weighted characteristic pressure gradient of $grd\_p_{C\_W}=0.0048$ bar/revolution. The latter value can also be calculated in that the displacement $V_K$ of the compressor multiplied by the volumetric efficiency $\eta V$ is divided by the storage volume $V_S$ of all compressed-air consumer circuits $(grd\_p_{C\_W}=\eta V \times V_K/V_S)$.

The monitoring time period $T_M$, in which the weighted pressure gradients $grd\_p_{V\_W}$ of multiple delivery modes of the compressor are compared with the particular gradient limiting value $grd\_p_{G\_W}$, can be defined in different ways.

The monitoring time period $T_M$ can be defined as the time period since the initial start-up of the motor vehicle or, for example, since a greater maintenance or repair event at the compressor or the compressed-air supply system.

It is also possible, however, that the monitoring time period $T_M$ is defined as the cumulative operating time of the motor vehicle, for example, since the initial start-up of the motor vehicle or, for example, since a greater maintenance or repair event at the compressor or the compressed-air supply system.

Likewise, it is possible that the monitoring time period $T_M$ is defined as the cumulative distance traveled by the motor vehicle, for example, since the initial start-up of the motor vehicle or, for example, since a greater maintenance or repair event at the compressor or the compressed-air supply system.

In order to specifically relate the monitoring time period $T_M$ to the delivery mode of the compressor, it is advantageous, however, when the monitoring time period $T_M$ is defined as the cumulative delivery mode duration of the compressor, for example, since the initial start-up of the motor vehicle or, for example, since a greater maintenance or repair event at the compressor or the compressed-air supply system.

The monitoring method according to the invention makes it possible to maintain multiple fault accounts for various causes of a fault, wherein the adaptation factor $f_A$ of the characteristic pressure gradient $grd\_p_{C\_W}$ and/or the type as well as length of the monitoring time period $T_M$ can be established in different ways for monitoring various fault sources.

For example, in order to detect a delivery rate of the compressor that is diminishing due to damage, it is advantageous to utilize a relatively short monitoring time period $T_M$ of, for example, one hour of operation, and a relatively low gradient limiting value grd_$p_{G\_W}$ with an adaptation factor of, for example, $f_A$=0.4.

On the other hand, if the objective is to detect a coking, i.e., a deposit of carbon, at the pressure valves and in the delivery line of the compressor, it is advantageous to utilize a very long monitoring time period and a relatively high gradient limiting value grd_$p_{G\_W}$ with an adaptation factor of, for example, $f_A$=0.9.

In order to detect certain causes of a fault, it is advantageous to perform the calculation of the weighted pressure gradient grd_$p_{V\_W}$ of the supply pressure $p_V$ not in the entire pressure and rotational speed range of, for example, $p_V$=10 bar to 12.5 bar and $n_K$=700 rpm to 2500 rpm, but rather only in a limited range of the supply pressure $p_V$ and/or in a limited range of the drive rotational speed $n_K$ of the compressor.

In this way, for example, the beginning of the slip of a friction clutch of a compressor can be detected in that the weighted pressure gradient grd_$p_{V\_W}$ in an upper range of the supply pressure $p_V$ of, for example, $p_V$=12 bar to 12.5 bar, and/or in an upper range of the drive rotational speed $n_K$ of the compressor of, for example, $n_K$=2000 rpm to 2500 rpm, has not exceeded the gradient limiting value grd_$p_{G\_W}$ within the predefined monitoring period $T_M$.

BRIEF DESCRIPTION OF DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 2:
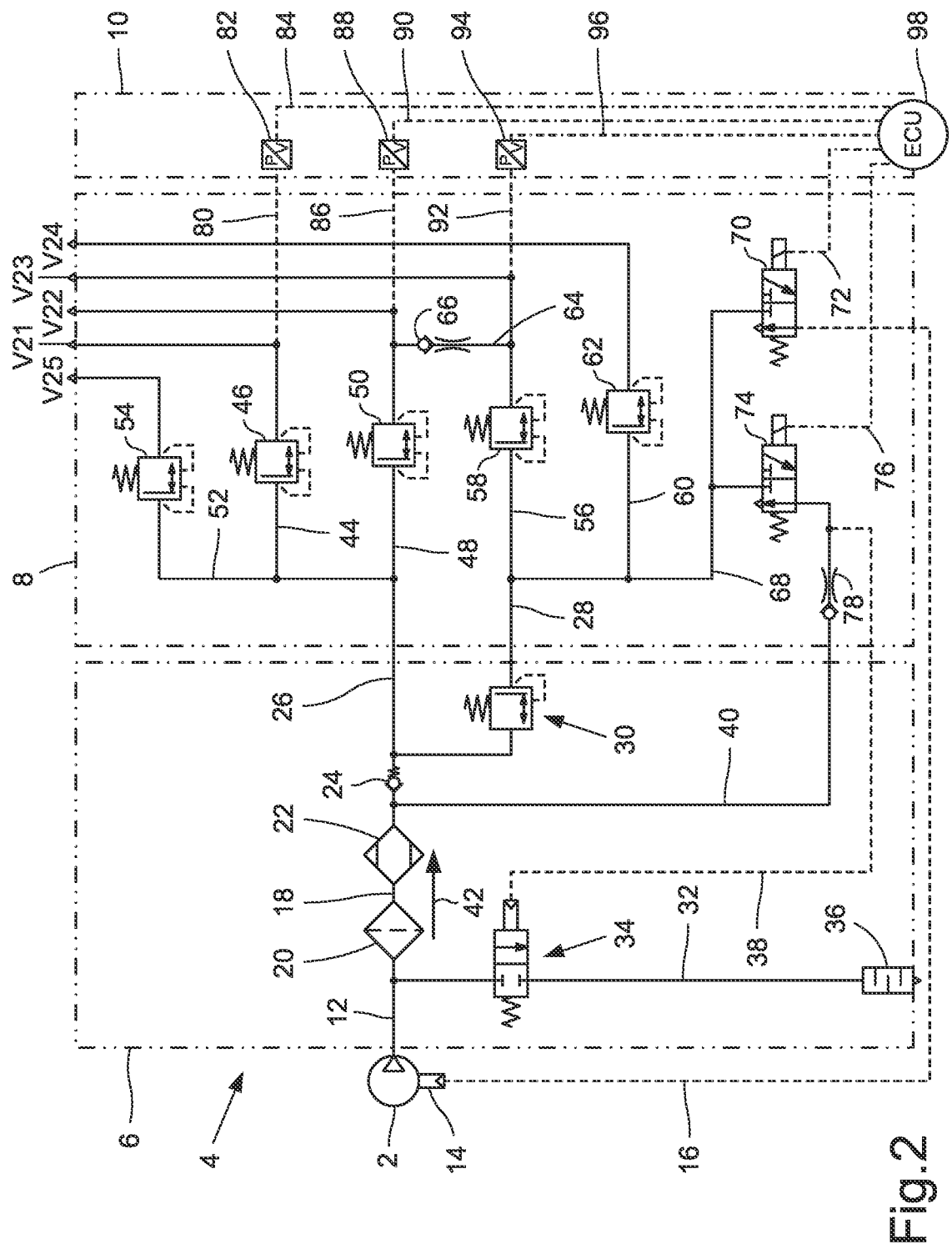
FIG. 2 shows the schematic configuration of a typical compressed-air supply system of a motor vehicle.

In FIG. 2, a compressor 2 and an electronically controlled compressed-air supply system 4 of a motor vehicle are shown in a schematic representation and in which the method according to the invention is applicable for monitoring the functioning of the compressor 2.

The compressed-air supply system 4 comprises the assemblies of a compressed-air preparation unit 6, a multi-circuit protection valve unit 8, and an electronic control unit 10.

The compressor 2 is connected, on the output side, at a delivery line 12 and comprises a control pressure input 14. Due to the application of a sufficiently high control pressure from a connected control pressure line 16 at the control pressure input 14, a friction clutch (not represented) is engaged, whereby the compressor 2 is drivingly connected to a drive engine (not represented) of the motor vehicle and, as a result, switched into the delivery mode. In the delivery mode, the compressor 2 draws in air from the surroundings and delivers it, as compressed air, into the delivery line 12.

The compressed-air preparation unit 6 comprises a dryer line 18, in which a filter unit 20, a dryer unit 22, and a check valve 24 are arranged, one after the other, in a delivery direction indicated by the direction arrow 42. The dryer line 18 is connected, on the input side, at the delivery line 12 and, on the output side, branches into two main supply lines 26, 28. The second main supply line 28 is limited with respect to its maximum pressure via an installed pressure limiting valve 30. The pressure limiting valve 30 preferably has a hysteresis. Ahead of the filter unit 20, a vent line 32, in which a vent valve 34 is arranged, branches off from the dryer line 18 and leads into the surroundings via a muffler 36. The vent valve 34 is designed as a pressure-controlled 2/2-way switching valve, which is closed in the control-pressureless state and can be opened via the application of a sufficiently high control pressure at a control pressure line 38 connected at its control pressure input. Between the dryer unit 22 and the check valve 24, a regeneration line 40 is connected at the dryer line 18, through which already dried compressed air is returnable to the dryer unit 22.

The multi-circuit protection valve unit 8 comprises five overflow valves 46, 50, 54, 58, 62 of a multi-circuit protection valve (not represented in greater detail), a regeneration control valve 74, a compressor control valve 70, and two throttle check valves 66, 78. In the multi-circuit protection valve unit 8, the first main supply line 26 branches into the three supply lines 44, 48, 52 of three compressed-air consumer circuits V21, V22, V25.

The compressed-air consumer circuits V21, V22, V25 are, for example, a first service brake circuit V21 of the motor vehicle, a second service brake circuit V22 of the motor vehicle, and an air suspension circuit V25. The pressure-limited second main supply line 28 branches, in the multi-circuit protection valve unit 8, into the two supply lines 56, 60 of two further compressed-air consumer circuits V23, V24 and into a control pressure main line 68. The further compressed-air consumer circuits V23, V24 are, for example, a trailer and parking brake circuit V23 and an auxiliary consumer circuit V24. One of the overflow valves 46, 50, 54, 58, 62 of the multi-circuit protection valve is arranged in each of the supply lines 44, 48, 52, 56, 60, respectively, of the five compressed-air consumer circuits V21, V22, V23, V24, V25.

On the output side of the relevant overflow valves 58, 50, a connection line 64 with the throttle check valve 66 opening in the direction of the supply line 48 of the second service brake circuit V22 is arranged between the supply line 56 of the trailer and parking brake circuit V23 and the supply line 48 of the second service brake circuit V22. Via this connection, at an appropriate pressure gradient, compressed air can flow out of the trailer and parking brake circuit V23 into the second service brake circuit V22 and drain the parking brake circuit V23.

The compressor control valve 70 and the regeneration control valve 74 are connected, on the input side, at the control pressure main line 68. Each of the two control valves 70, 74 is designed as a 3/2-way solenoid switching valve, the input-side connections of which are blocked in the de-energized state and which are switchable via the energization of an associated electrical control line 72, 76, respectively.

Due to an energization of the compressor control valve 70, the control pressure line 16 of the compressor 2 connected to the compressor control valve 70 on the output side is connected to the control pressure main line 68, whereby the friction clutch of the compressor 2 is disengaged and the compressor 2 is decoupled from the drive engine. When the control pressure input 14 of the compressor 2 is pressureless, the friction clutch of the compressor 2 is engaged, and so the compressor 2 is then in the delivery mode with the drive motor running. In the delivery mode, the compressor 2 delivers compressed air, according to the delivery direction indicated by the direction arrow 42, through the delivery line 12, the filter unit 20, the dryer line 18, the dryer unit 22, and the check valve 24 into the two main supply lines 26, 28 and, via the overflow valves 46, 50, 54, 58, 62 of the multi-circuit protection valve, further into the compressed-air consumer circuits V21, V22, V23, V24, V25.

Due to an energization of the regeneration control valve 74, the regeneration line 40 connected thereto on the output side, in which the throttle check valve 78 opening in the direction of the dryer line 18 is arranged, is connected to the control pressure main line 68. As a result, the control pressure line 38 of the vent valve 34, which is connected at the regeneration line 40 between the regeneration control valve 74 and the throttle check valve 78, is also acted upon by the pressure prevailing in the control pressure main line 68, whereby the vent valve 34 is opened. As a result, already dried compressed air flows out of the second main supply line 28 via the control pressure main line 68 and the regeneration line 40 counter to the delivery direction 42 through the dryer unit 22 and the filter unit 20, via the vent line 32 and the muffler 36 into the surroundings, whereby the dryer unit 22 is regenerated and the filter unit 20 is cleaned.

A pressure sensor 82, 88, 94 is connected, via a connection line 80, 86, 92, respectively, at the supply lines 44, 48, 56 of the first service brake circuit V21, of the second service brake circuit V22, and of the trailer and parking brake circuit V23. These pressure sensors 82, 88, 94 are connected via an electrical sensor line 84, 90, 96, respectively, to an electronic control unit 98 (ECU). Likewise, the compressor control valve 70 and the regeneration control valve 74 are connected, via their electrical control lines 72, 76, to the electronic control unit 98. The pressure sensors 82, 88, 94 and the electronic control unit 98 are combined in the assembly of the electronic control unit 10.

The method according to the invention for monitoring the functioning of a compressor 2 is explained in greater detail in the following with reference to the above-described embodiment and arrangement of the compressor 2 and of the compressed-air supply system 4 on the basis of the diagram according to FIG. 1. In the diagram, the engine speed $n_M$ of the drive engine, which is identical to the drive rotational speed $n_K$ of the compressor 2 when the friction clutch is engaged, the delivery pressure $p_F$ effective in the delivery line 12 at the output of the compressor 2, and the supply pressure $p_V$ effective in one of the supply lines 44, 48 and detected with the aid of a pressure sensor 82, 88, respectively, are represented with respect to the time t. The delivery pressure $p_F$ of the compressor 2 is not detected with the aid of sensors, per se, and is contained in the diagram from FIG. 1 only for better understanding in the present case. Moreover, in the diagram according to FIG. 1, the time profiles of the pressure gradient $grd\_p_V$ of the supply pressure $p_V$, of the pressure gradient $grd\_p_{V\_W}$ weighted with the drive rotational speed $n_K$ of the compressor 2 and with the engine speed $n_M$ of the drive engine, and of a gradient limiting value $grd\_p_{G\_W}$ are represented.

The monitoring method provides that the supply pressure $p_V$ in the supply line 44, 48 of at least one compressed-air consumer circuit V21, V22 provided with a pressure sensor 82, 88 is continuously detected with the aid of sensors in a predefined interval $\Delta t$. The pressure gradients $grd\_p_V$ of the supply pressure $p_V$ are then continuously calculated, at least during the delivery mode ($T_{F1}$, $T_{F2}$, $T_{F3}$) of the compressor 2, from at least two consecutively detected pressure values $p_{V\_i}$, $p_{V\_i+1}$ in each case and the time difference $\Delta t$ between their detection. Thereafter, the pressure gradients $grd\_p_V$ are weighted in order to determine the weighted pressure gradient $grd\_p_{V\_W}$ by division by the particular current drive rotational speed $n_K$ of the compressor ($grd\_p_{V\_W}=grd\_p_V/n_K$) and low-pass filtered.

Figure 1:
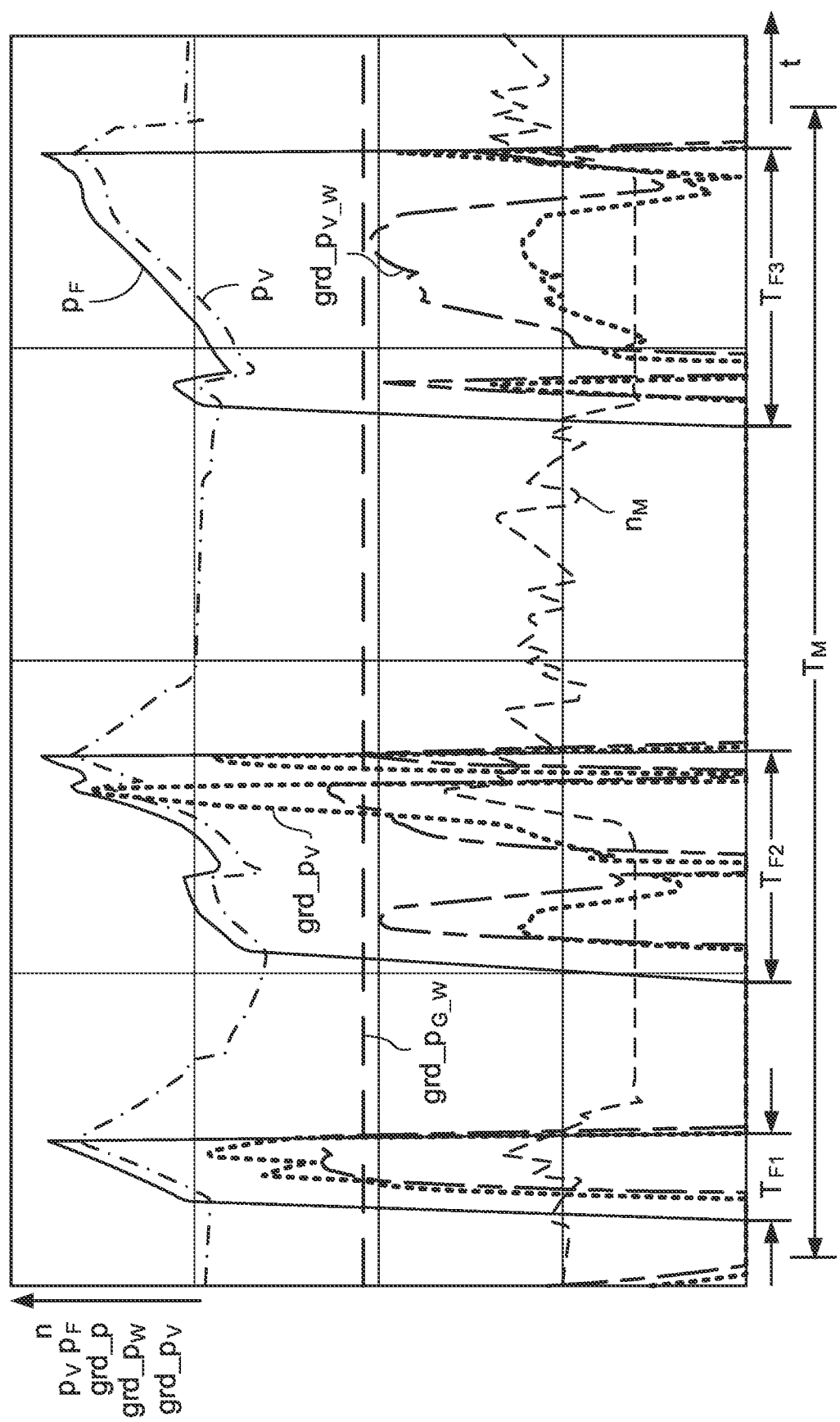
FIG. 1 shows a diagram with the time profiles of various characteristic values of a compressed-air supply system.

The pressure gradients $grd\_p_{V\_W}$ weighted in this way are compared with a predefined gradient limiting value $grd\_p_{G\_W}$, which is represented as a straight line in FIG. 1 and which is defined as a fraction, taken into account by an adaptation factor $f_A<1$, of a weighted pressure gradient $grd\_p_{C\_W}$ that is characteristic for the compressor 2, the compressed-air supply system 4, and the connected compressed-air consumer circuits V21, V22, V23, V24, V25 ($grd\_p_{W\_G}=f_A \times grd\_p_{C\_W}$).

If the weighted pressure gradient $grd\_p_{V\_W}$ of the supply pressure $p_V$ has not exceeded the gradient limiting value $grd\_p_{G\_W}$ within a predefined monitoring time period $T_M$, which can be considered, by way of example, as the time period represented in the diagram according to FIG. 1, a warning message or a warning signal is output. The warning signal or the warning message can take place or be given via the illumination of a warning light in the dashboard or in the instrument panel of the motor vehicle, via the illumination of an appropriate warning icon in the instrument panel, via the display of an appropriate warning text in a display of the instrument panel, and/or via the storage of an appropriate error message in a fault memory associated with the electronic control unit 10 of the compressed-air supply system 4.

The time period $T_M$ indicated in the diagram according to FIG. 1 comprises three delivery modes $T_{F1}$, $T_{F2}$, $T_{F3}$ of the compressor 2. Since the weighted pressure gradient $grd\_p_{V\_W}$ of the supply pressure $p_V$ has exceeded the predefined gradient limiting value $grd\_p_{G\_W}$ during the first two delivery modes $T_{F1}$, $T_{F2}$, a warning signal or a warning message is not output in the present case example. The electronic control unit 98 would output a warning signal or a warning message only for the case in which the weighted pressure gradient $grd\_p_{V\_W}$ of the supply pressure $p_V$ does not exceed the predefined gradient limiting value $grd\_p_{G\_W}$ in all three delivery modes $T_{F1}$, $T_{F2}$, $T_{F3}$ of the compressor 2.

Within the scope of the monitoring method according to the invention, multiple fault accounts can be maintained for various causes of a fault, for which the adaptation factor $f_A$ of the characteristic pressure gradient $grd\_p_{C\_W}$ and/or the type and length of the monitoring time period $T_M$ can be established in different ways. Likewise, in order to detect certain causes of a fault, the calculation of the weighted pressure gradient $grd\_p_{V\_W}$ can be performed only in a limited range of the supply pressure $p_V$ and/or in a limited range of the drive rotational speed $n_K$ of the compressor 2.

LIST OF REFERENCE NUMBERS (PART OF THE DESCRIPTION)

2 compressor
4 compressed-air supply system
6 compressed-air preparation unit (assembly)
8 multi-circuit protection valve, multi-circuit protection valve unit (assembly)
10 electronic control unit including sensors (assembly)
12 delivery line
14 control pressure input
16 control pressure line
18 dryer line
20 filter unit
22 dryer unit
24 check valve
26 first main supply line 28 second main supply line
30 pressure limiting valve
32 vent line
34 vent valve
36 muffler
38 control pressure line
40 regeneration line
42 direction arrow, delivery direction
44 supply line
46 overflow valve
48 supply line
50 overflow valve
52 supply line
54 overflow valve
56 supply line
58 overflow valve
60 supply line
62 overflow valve
64 connection line
66 throttle check valve
68 control pressure main line
70 compressor control valve
72 electrical control line
74 regeneration control valve
76 electrical control line
78 throttle check valve
80 connection line
82 pressure sensor
84 electrical sensor line
86 connection line
88 pressure sensor
90 electrical sensor line
92 connection line
94 pressure sensor
96 electrical sensor line
98 electronic control unit (ECU)
ECU electronic control unit
$f_A$ adaptation factor
grd_p pressure gradient
grd_$p_C$ characteristic pressure gradient (unweighted)
grd_$p_{C\_W}$ characteristic pressure gradient (weighted)
grd_$p_G$ gradient limiting value (unweighted)
grd_$p_{C\_W}$ gradient limiting value (weighted)
grd_$p_V$ pressure gradient of the supply pressure
grd_$p_{V\_W}$ weighted pressure gradient of the supply pressure
grd_$p_W$ weighted pressure gradient
$i_{PTO}$ ratio of a power take-off
n rotational speed
$n_K$ drive rotational speed of the compressor
$n_{K\_m}$ mean drive rotational speed of the compressor
$n_M$ engine speed
p pressure
$p_F$ delivery pressure of the compressor
$p_V$ supply pressure
$p_{V\_i}$ $i^{th}$ measured value of the supply pressure
$p_{V\_i+1}$ $(i+1)^{th}$ measured value of the supply pressure
$Q_{soll}$ rotational speed-dependent setpoint delivery rate
$Q_{soll\_m}$ mean setpoint delivery rate
t time
$T_A$ period of time
$T_A'$ period of time
$T_M$ monitoring time period
$T_{F1}$ first delivery mode duration
$T_{F2}$ second delivery mode duration
$T_{F3}$ third delivery mode duration
$V_K$ displacement of the compressor
$V_S$ storage volume
V21 compressed-air consumer circuit, first service brake circuit
V22 compressed-air consumer circuit, second service brake circuit
V23 compressed-air consumer circuit, trailer and parking brake circuit
V24 compressed-air consumer circuit, auxiliary consumer circuit
V25 compressed-air consumer circuit, air suspension circuit
Δt interval, time difference
η V volumetric efficiency The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method for monitoring the functioning of a compressor, which is switchable into a delivery mode, and which, in the delivery mode, delivers compressed air via a dryer line of a compressed-air preparation unit into a main supply line, from which multiple supply lines of compressed-air consumer circuits branch off, wherein a pressure sensor is connected to one of the multiple supply lines, wherein, in the delivery mode of the compressor, a supply pressure $p_V$ is detected with the aid of the pressure sensor, a pressure gradient $grd\_p_V$ derived therefrom is compared to a predefined gradient limiting value $grd\_p_{G\_W}$, and, depending on a result of the comparison, a warning message or a warning signal is output or not, including the following method steps:
   a) continuously detecting, with the aid of the pressure sensor, the supply pressure $p_V$ in the one of the multiple supply lines of at least one compressed-air consumer circuit provided with the pressure sensor,
   b) continuously calculating the pressure gradient $grd\_p_V$ of the supply pressure $p_V$ from at least two consecutively detected pressure values $p_{V\_i}$, $p_{V\_i+1}$ and the time difference $\Delta t$ between their detection at least during the delivery mode of the compressor,
   c) weighting the pressure gradient $grd\_p_V$ by division by a current drive rotational speed $n_K$ of the compressor ($grd\_p_{V\_W}$ w=$grd\_p_V/n_K$) or by a current rotational speed-dependent setpoint delivery rate $Q_{soll}$ of the compressor ($grd\_p_{V\_W}$=$grd\_p_V/Q_{soll}$),
   d) comparing the weighted pressure gradient $grd\_p_{V\_W}$ with the predefined gradient limiting value $grd\_p_{G\_W}$,
   e) outputting the warning message or warning signal if the weighted pressure gradient $grd\_p_{V\_W}$ has not exceeded the predefined gradient limiting value $grd\_p_{G\_W}$ within a predefined monitoring time period $T_M$.

2. The method as claimed in claim 1, wherein pressure fluctuation values of the supply pressure $p_V$ that are based on thermodynamic effects that arise in the compressed-air consumer circuits after consumption of compressed air are not taken into account when continuously calculating the pressure gradient $grd\_p_V$ of the supply pressure $p_V$.

3. The method as claimed in claim 1, wherein the values of the pressure gradient $grd\_p_V$ and the weighted pressure gradient $grd\_p_{V\_W}$ are low-pass filtered.

4. The method as claimed in claim 3, wherein the values of the pressure gradient $grd\_p_V$ and the weighted pressure gradient $grd\_p_{V\_W}$ are low-pass filtered for an established period of time $T_A$.

5. The method as claimed in claim 3, wherein the values of the pressure gradient $grd\_p_V$ and the weighted pressure gradient $grd\_p_{V\_W}$ are low-pass filtered for an established period of time $T_A$ after the occurrence of a drop of the supply pressure $p_V$.

6. The method as claimed in claim 1, wherein the calculation of the pressure gradient $grd\_p_V$ and the weighted pressure gradient $grd\_p_{V\_W}$ is suspended for an established period of time $T_A'$ after the occurrence of a drop of the supply pressure $p_V$.

7. The method as claimed in claim 1, wherein the predefined monitoring time period $T_M$ is defined as a cumulative operating time of a motor vehicle.

8. The method as claimed in claim 1, wherein the predefined monitoring time period $T_M$ is based on a cumulative distance traveled by a motor vehicle.

9. The method as claimed in claim 1, wherein the predefined monitoring time period $T_M$ is defined as the cumulative delivery mode duration of the compressor.

10. The method as claimed in claim 1, wherein multiple fault accounts are maintained in computer readable memory for various causes of a fault.

11. The method as claimed in claim 1, wherein the step of weighting the pressure gradient $grd\_p_V$ is performed only in a limited range of the supply pressure $p_V$ in order to detect certain causes of a fault.

12. The method as claimed in claim 1, wherein the step of weighting the pressure gradient $grd\_p_V$ is performed only in a limited range of the current drive rotational speed $n_K$ of the compressor in order to detect certain causes of a fault.

13. The method as claimed in claim 11, wherein the compressor includes a friction clutch, and wherein slipping of the friction clutch of the compressor is detected in that the weighted pressure gradient $grd\_p_{V\_W}$ in an upper range of the supply pressure $p_V$ has not exceeded the gradient limiting value $grd\_p_{G\_W}$ within the predefined monitoring time period $T_M$.

14. The method as claimed in claim 11, wherein the compressor includes a friction clutch, and wherein slipping of the friction clutch of the compressor is detected in that the weighted pressure gradient $grd\_p_{V\_W}$ in an upper range of the drive rotational speed $n_K$ of the compressor has not exceeded the gradient limiting value $grd\_p_{G\_W}$ within the predefined monitoring time period $T_M$.

15. A method for monitoring the functioning of a compressor, which is switchable into a delivery mode, and which, in the delivery mode, delivers compressed air via a dryer line of a compressed-air preparation unit into a main supply line, from which multiple supply lines of compressed-air consumer circuits branch off, wherein a pressure sensor is connected to one of the multiple supply lines, wherein, in the delivery mode of the compressor, a supply pressure $p_V$ is detected with the aid of the pressure sensor, a pressure gradient $grd\_p_V$ derived therefrom is compared to a predefined gradient limiting value $grd\_p_G$, and, depending on a result of the comparison, a warning message or a warning signal is output or not, including the following method steps:
   a) continuously detecting, with the aid of the pressure sensor, the supply pressure $p_V$ in the one of the multiple supply lines of at least one compressed-air consumer circuit provided with the pressure sensor,
   b) continuously calculating the pressure gradient $grd\_p_V$ of the supply pressure $p_V$ from at least two consecutively detected pressure values $p_{V\_i}$, $p_{V\_i+1}$ and the time difference $\Delta t$ between their detection at least during the delivery mode of the compressor,
   c) comparing the pressure gradient $grd\_p_V$ with a current, rotational speed-dependent, predefined gradient limiting value $grd\_p_G$, which does not take withdrawal of compressed air by consumers into account,
   d) outputting the warning message or warning signal if the pressure gradient $grd\_p_V$ has not exceeded the predefined gradient limiting value $grd\_p_G$ within a predefined monitoring time period $T_M$.

16. The method as claimed in claim 15, wherein the predefined gradient limiting value $grd\_p_G$ is defined as a fraction, determined by an adaptation factor $f_A<1$, of a weighted pressure gradient $grd\_p_{C\_W}$ that is characteristic for the compressor and the connected compressed-air consumer circuits $grd\_p_G=f_A\times grd\_p_{C\_W}$.

17. The method as claimed in claim 16, wherein the adaptation factor $f_A$ is a first adaptation factor $f_{A1}$, wherein the weighted pressure gradient $grd\_p_{C\_W}$ is multiplied by a second adaptation factor $f_{A2}$ less than the first adaptation factor $f_{A1}$ when a permanent consumption of compressed air is present in one of the compressed-air consumer circuits.

18. The method as claimed in claim 16, wherein the weighted pressure gradient $grd\_p_{C\_W}$ is determined from a displacement $V_K$ of the compressor, a volumetric efficiency $\eta_V$ of the compressor, and a storage volume $V_S$ of all compressed-air consumer circuits.

\* \* \* \* \*